US006477964B1

(12) United States Patent
Tygard

(10) Patent No.: US 6,477,964 B1
(45) Date of Patent: Nov. 12, 2002

(54) GUIDE SYSTEM FOR A FORKLIFT

(75) Inventor: Edward Tygard, McMurray, PA (US)

(73) Assignee: Tygard Machine and Manufacturing Company, Washington, PA (US)

( * ) Notice: Subject to any disclaimer, the term of this patent is extended or adjusted under 35 U.S.C. 154(b) by 0 days.

(21) Appl. No.: 09/418,259

(22) Filed: Oct. 15, 1999

(51) Int. Cl.[7] .................... B60C 11/00

(52) U.S. Cl. .................... 104/247; 104/242; 104/243; 105/72.2

(58) Field of Search .................... 104/242, 243, 104/244.1, 245, 247; 105/72.2, 215.1

(56) References Cited

U.S. PATENT DOCUMENTS 3,814,026 A * 6/1974 Maloney .................... 104/246
3,831,786 A * 8/1974 Griesenbrock .................... 104/243
4,213,396 A * 7/1980 Mehren et al. .................... 104/130
4,630,543 A * 12/1986 McQueen .................... 104/247
5,161,668 A * 11/1992 Datema et al. .................... 104/245
5,449,264 A * 9/1995 Poletto .................... 104/242
5,516,255 A 5/1996 Tygard .................... 414/607
5,704,295 A * 1/1998 Lohr .................... 104/243
6,036,427 A * 3/2000 Kita et al. .................... 104/419

OTHER PUBLICATIONS

Copy of blueprint prepared in Jul., 1995 of forklift guide system developed by Applicant.

* cited by examiner

*Primary Examiner*—Mark T. Le
(74) *Attorney, Agent, or Firm*—Michael Tobias

(57) ABSTRACT

A guide system for a forklift includes a single guide rail extending along a path and rollers mounted on the forklift for engagement with opposite sides of the rail. The rollers can move down the rail as the wheels on the forklift become worn.

12 Claims, 5 Drawing Sheets

GUIDE SYSTEM FOR A FORKLIFT

BACKGROUND OF THE INVENTION

1. Field of the Invention

This invention relates to a system for guiding a forklift along a path.

2. Description of the Related Art

In a factory, warehouse, or other facility, when a forklift or other vehicle used for material handling is repeatedly moved along the same path, it may be desirable to install guide rails for the vehicle to constrain the vehicle to move along the path. The use of guide rails may be advantageous in that the operator need not steer the vehicle and can concentrate on manipulating the lifting equipment with which the vehicle is equipped. Furthermore, the guide rails can allow the vehicle to follow the path more precisely than would be possible were the operator steering the vehicle manually.

In one possible arrangement, guide rails can be disposed in parallel on the floor of the facility, with the spacing between the rails being slightly greater than the width of the vehicle measured at the wheels. The vehicle can be driven into the space between the rails, with the outer sidewall of each wheel of the vehicle facing and closely spaced from one of the rails. The vehicle can then be constrained by the rails to moving along a path parallel to the rails.

The above-described arrangement has a number of disadvantages. One is that the distance between the rails, which is dictated by the width of the vehicle, is such that a mechanical sweeper cannot fit between the rails, where dirt and other materials tend to accumulate. Therefore, it may be necessary to clean the space between the rails manually. Furthermore, since the rails guide the vehicle by contact with the side walls of the wheels of the vehicle, the wheels suffer considerable abrasion, which not only generates dust and other debris (such as rubber scraps when the wheels are equipped with rubber tires) but also decreases the lifespan of the wheels. In addition, since the separation between the rails must be wide enough for the wheels of the vehicle to freely pass between them, the sides of the wheels tend to bounce against the rails and may be dented or bent by the contact, with the extent of bending of the wheels often being severe enough to render it difficult to remove the wheels from the vehicle when it is necessary to replace the tires of the wheels.

SUMMARY OF THE INVENTION

The present invention provides a system for guiding a forklift along a path.

The present invention also provides an arrangement including a forklift and a system for guiding the forklift along a path.

The present invention also provides a method of operating a forklift.

According to one aspect of the present invention, a guide system for a forklift includes a single guide rail and a first pair of rollers between which the rail can pass mounted on the forklift.

According to another aspect of the present invention, a forklift includes a plurality of wheels, a body supported by the wheels, and a pair of rollers mounted on the body for engagement with a guide rail.

According to still another aspect of the present invention, a method of operating a forklift includes moving a forklift along a path while guiding the forklift with a guide rail passing between a pair of rollers mounted on the forklift.

A guide system according to the present invention preferably employs only a single guide rail, so the region of the floor of the facility in which the guide system is installed surrounding the guide rail can be easily cleaned using a power floor sweeper, with no accumulation of debris such as occurs with a two-rail guide system. Furthermore, the wheels on the forklift need not contact the guide rail, so they are not subject to wear or damage by the guide rail, and the guide rail is not subject to wear or damage by the wheels. In addition, the guide rail can guide the forklift extremely stably with little or no sideways wobbling of the forklift with respect to the rail.

While a guide system according to the present invention is particularly suited for use with a forklift, it can be employed with any vehicle which needs to be guided along a path.

DESCRIPTION OF PREFERRED EMBODIMENTS

Figure 1:
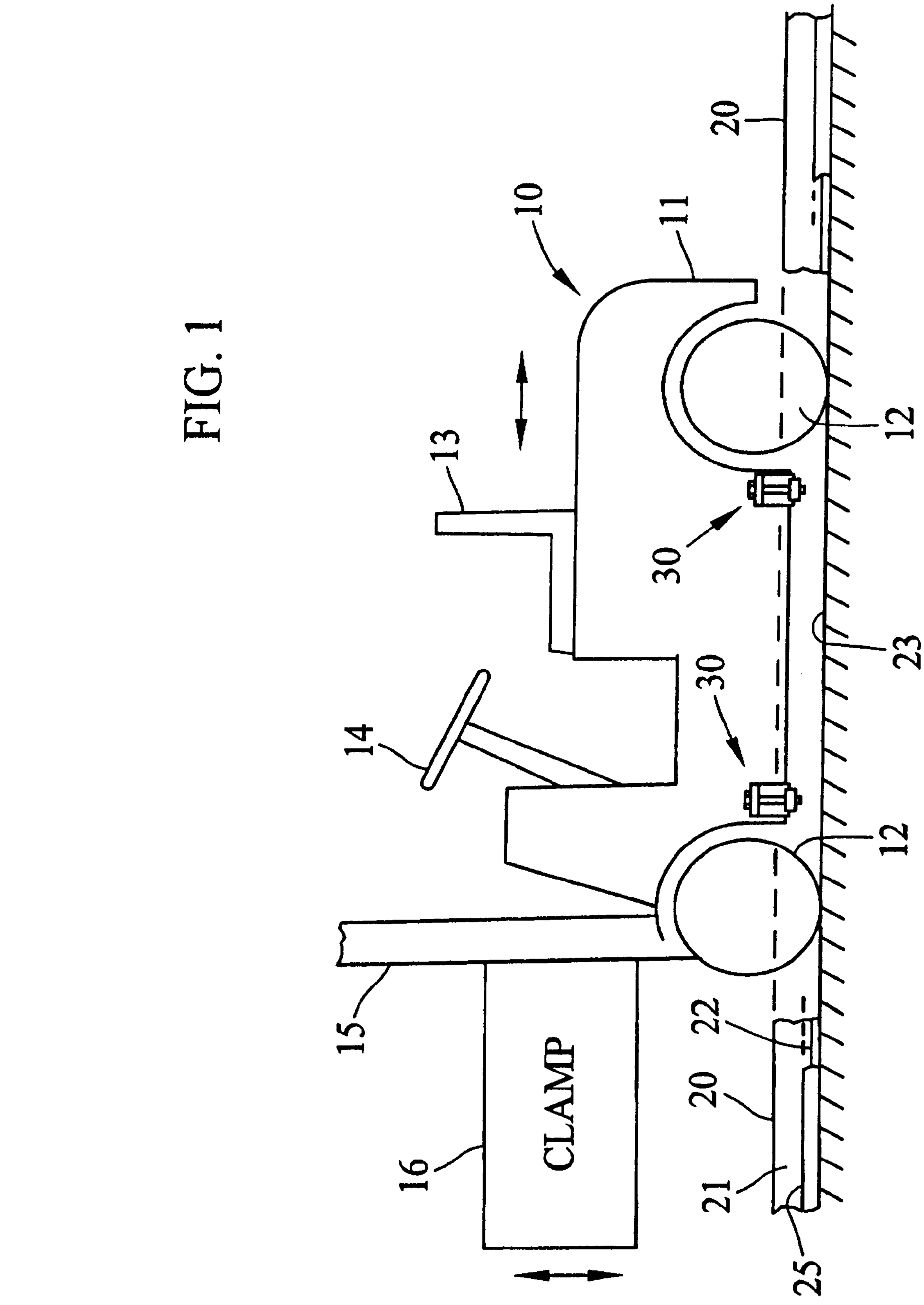
FIG. 1 is a schematic side elevation of an embodiment of a guide system according to the present invention being used to guide a forklift.
Figure 2:
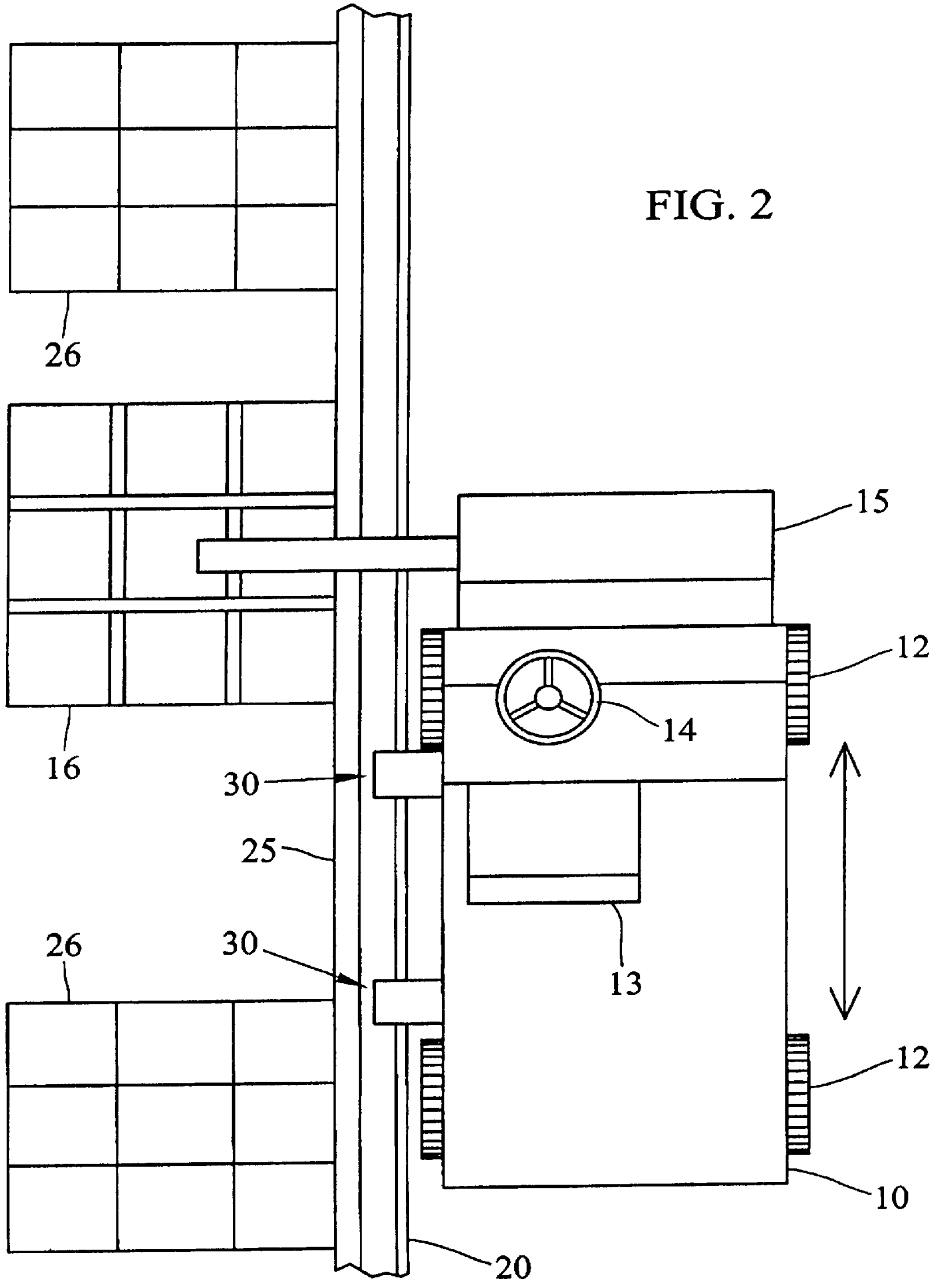
FIG. 2 is a schematic plan view of the embodiment of FIG. 1.

FIGS. 1 and 2 are respectively a side elevation and a plan view of an embodiment of a guide system according to the present invention being used to guide a vehicle along a path. The illustrated vehicle is a forklift 10, but as stated above, the vehicle may be of any type which is to be guided along a path. The forklift 10, which may be of conventional or other desired structure, typically includes a body 11 supported by a plurality of wheels 12 (typically 4) and containing an unillustrated drive mechanism for propelling the forklift 10 as well as for driving lifting equipment of the forklift 10, a seat 13 for the driver, a steering wheel 14 or other steering mechanism, and an upwardly extending mast 15 on which forks or other lifting equipment are mounted. The guide system includes a single guide rail 20 extending along a desired path along which the forklift 10 is to travel is secured to the floor 23 of the facility in which the forklift 10 is to be operated.

The mast 15 may be equipped with a wide variety of devices for engaging a load which is to be moved by the forklift 10, such as forks for engaging a pallet, a bucket for holding loose materials, or various types of clamps known in the art, depending upon the nature of the load being handled. For example, the illustrated mast 15 supports a clamp 16 such as that described in U.S. Pat. No. 5,516,255 or U.S. patent application Ser. No. 08/889,362 (the disclosures of which are incorporated by reference) which can lift one or more layers of objects by grasping the layers from their sides without supporting the layers from below. The clamp 16 is shown extending to the side of the forklift 10 so as to be able to access objects 26 disposed alongside the rail 20 and laterally spaced from the forklift 10, but a clamp or other lifting equipment may instead be installed on the forklift 10 so as to access objects located directly in front of the forklift 10 or so as to access objects located either in front of or to the side of the forklift 10.

The guide system also includes one or more roller assemblies 30 which are mounted on the forklift 10 and which can engage with the rail 20 as the forklift 10 moves along the rail 20. The forklift 10 may have a single roller assembly 30, but the forklift 10 can be more stably guided if there are a plurality of the roller assemblies 30 spaced along the length of the forklift 10. The illustrated embodiment employs two roller assemblies 30. A larger number of roller assemblies 30 may be employed, but two roller assemblies 30 are sufficient to maintain the forklift 10 at a constant angle to the rail 20. The roller assemblies 30 can be mounted on any convenient portion of the forklift 10, with the body 11 frequently being a suitable location.

The roller assemblies 30 may be disposed such that the rail 20 passes beneath the body 11 of the forklift 10 between the wheels 12, but it is usually easier to install the roller assemblies 30 on a widthwise side of the body 11 such that the rail 20 is disposed alongside the body 11 rather than beneath it, preferably with the rail 20 spaced from the body 11 in the widthwise direction of the forklift 10 by a distance such that the wheels 12 of the forklift 10 do not contact the portion of the rail 20 contacted by the rollers of the roller assemblies 30.

Figure 3:
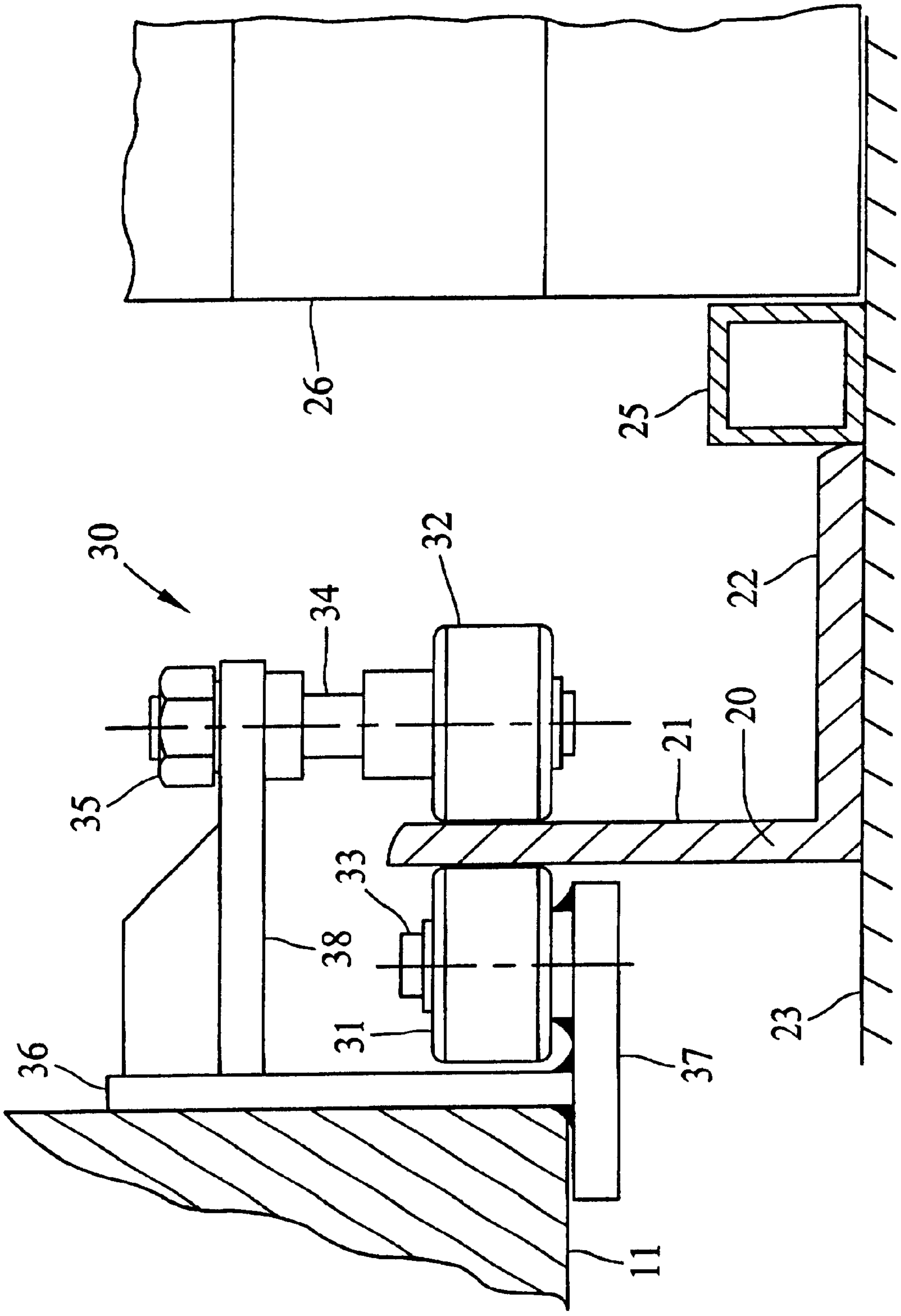
FIG. 3 is a cross-sectional elevation taken along line 3—3 of FIG. 1.

Each roller assembly 30 includes at least two rollers between which the rail 20 can pass. Each of the illustrated roller assemblies 30 has a pair of rollers including an inner roller 31 and an outer roller 32 both mounted on a frame 36 for engagement with opposite sides of the rail 20. As best shown in FIG. 3, in the present embodiment, the inner roller 31 is rotatably mounted on a shaft 33 extending upwards from a lower portion 37 of the frame 36, and the outer roller 32 is mounted on a shaft 34 extending downwards from an upper portion 38 of the frame 36. Alternatively, both rollers 31, 32 may be mounted on the same portion of the frame 36 with their shafts extending in the same direction.

Figure 4:
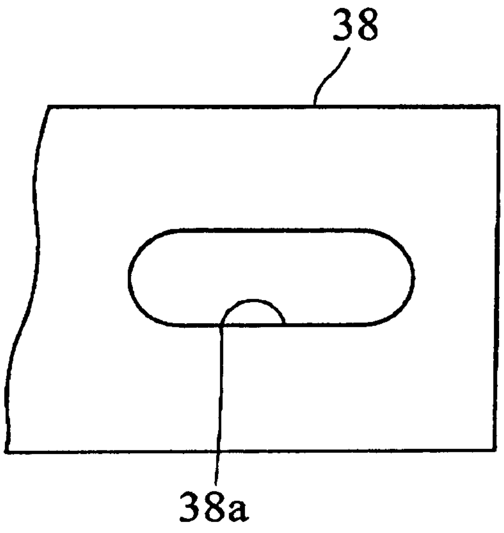
FIG. 4 is a plan view of a portion of the frame of the roller assembly of FIG. 3.
Figure 5:
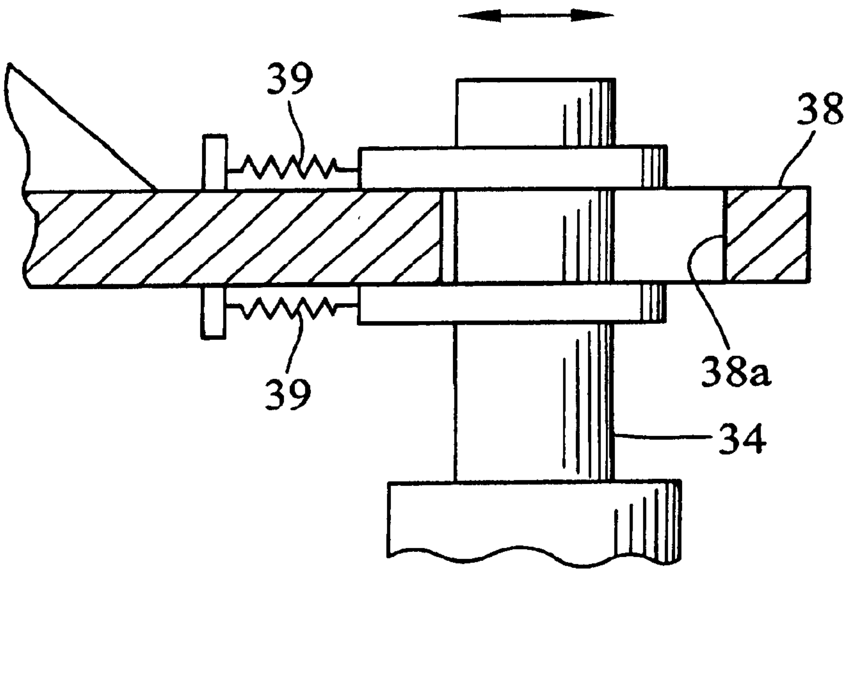
FIG. 5 is a schematic view of a modification of the roller assembly of FIG. 3 in which one of the rollers is spring biased towards the other roller.

The spacing between the rollers 31, 32 is not restricted and can be fixed or variable. For example, the spacing can be such that the rollers 31, 32 always contact the sides of the rail 20, or there may be a gap between one or both rollers and the rail 20. In order for each roller assembly 30 to accommodate rails of different widths or to enable the roller assemblies 30 to be adjusted for wear of the rollers or the rail 20, it may be desirable for the spacing between the rollers 31, 32 to be adjustable. The spacing between the rollers 31, 32 can be made adjustable in a variety of manners. In the present embodiment, the shaft 34 of the outer roller 32 is received in an elongated slot *38a* (shown in FIG. 4) in the upper portion 38 of the frame 36, and the shaft 34 can be secured in place in a desired location along the length of the slot *38a* by a nut 35 mounted on the shaft 34. As another alternative, as shown in FIG. 5, the shaft 34 of the outer roller 32 may be slidably disposed in the slot *38a* and biased towards the inner roller 31 by a spring 39 or other biasing member. As yet another alternative, both of the rollers 31, 32 may be movably supported on the frame 36 for movement towards and away from each other. The rollers 31, 32 are shown as being at the same height above the floor 23 as each other, but they may be at different heights. Each roller assembly 30 may be secured to the forklift 10 in any suitable manner. For example, the frame 36 of each roller assembly 30 may be welded or bolted to the body 11 of the forklift 10.

Roller assemblies 30 may be mounted on one or both widthwise sides of the forklift 10. In the latter case, a pair of roller assemblies 30 on one widthwise side of the forklift 10 can engage the rail 20 when the forklift 10 is facing in one direction, and a different pair of roller assemblies 30 on the opposite widthwise side of the forklift 10 can engage the rail 20 when the forklift 10 is facing in the opposite direction.

Figure 6:
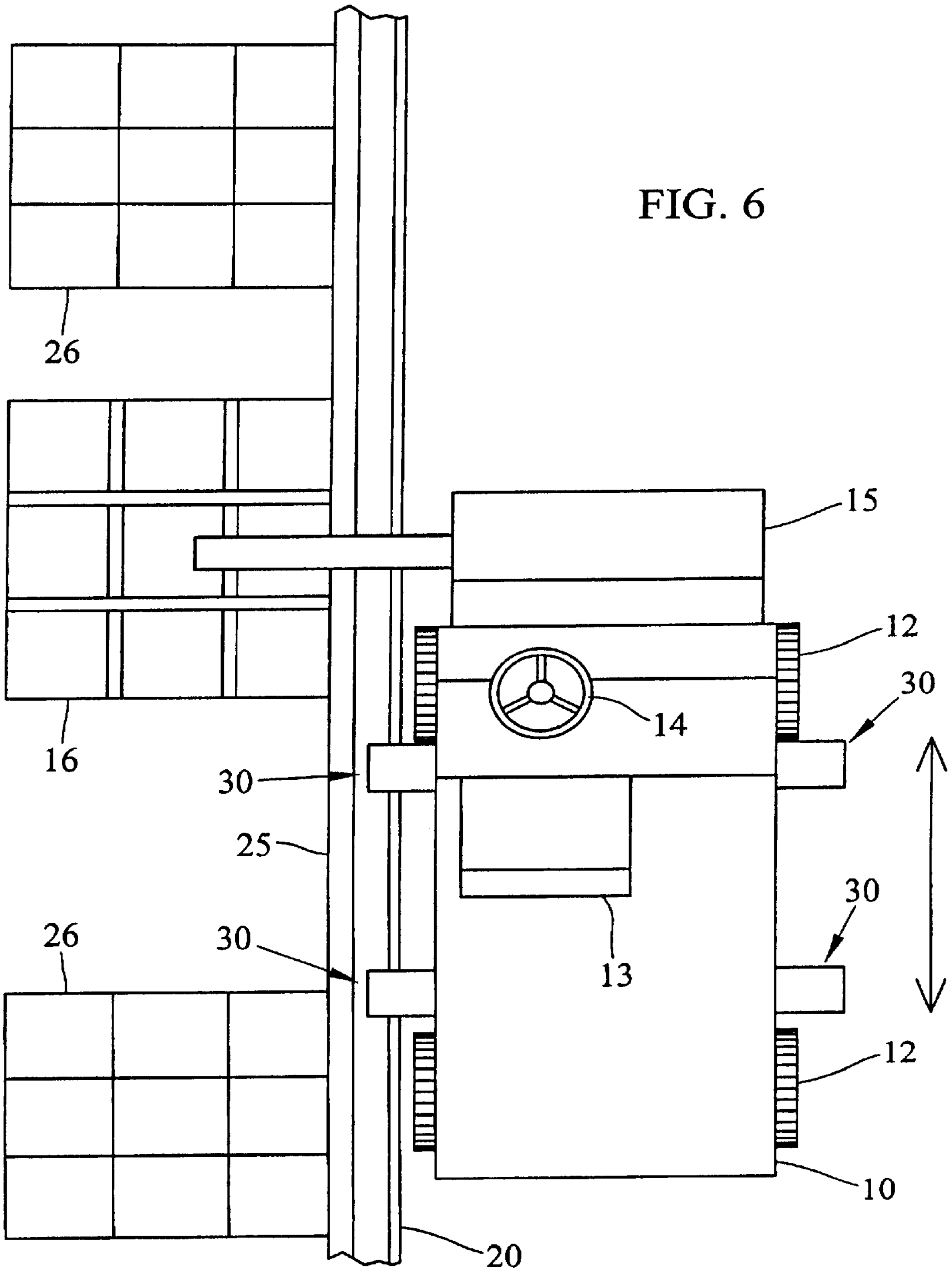
FIG. 6 is a schematic plan view of an embodiment having rollers on both widthwise sides of a forklift.

In FIG. 2, roller assemblies 30 are shown mounted on only one widthwise side of the forklift 10. FIG. 6 schematically illustrates an alternative embodiment having roller assemblies 30 mounted on both widthwise sides of a forklift 10.

The rail 20 may have any shape which enables it to pass between the rollers 31, 32 of the roller assemblies 30. In the present embodiment, the rail 20 comprises an elongated angle iron having two legs at right angles to each other, with one leg 21 supported by the floor 23 of the facility and the other leg 22 extending upwards away from the floor 23 to between the rollers 31, 32. The rail 20 can be secured to the floor 23 in a stationary location in any convenient manner, such as by bolting or clamping, either directly to the floor 23 or to a support member disposed between the rail 20 and the floor 23. Some examples of other possible shapes for the rail 20 include tubular shapes, plate shapes, and the shapes of conventional railway rails.

Over time, the wheels 12 of the forklift 10 may become worn, particularly when they are equipped with rubber tires, reducing the height of the body 11 of the forklift 10 above the floor 23. In the present embodiment, the rail 20 is shaped such that the rollers 31, 32 can engage the rail 20 at various locations along its height rather than at a single height so that as the wheels 12 become worn, the rollers 31, 32 can engage the rail 20 at progressively lower portions of the rail 20. Namely, the vertical portion of the rail 20 which is disposed between the rollers 31, 32 is without bulges in its thickness direction or other surface irregularities which could prevent the rollers 31, 32 from moving down the height of the vertical portion of the rail 20.

The rail 20 does not need to extend between the rollers from below. For example, the rail 20 may have a shape such that it extends between the rollers from above.

In the present embodiment, objects 26 to be lifted by the forklift 10 are typically disposed alongside the rail 20. A stop 25 against which the objects 26 can be placed to properly position them with respect to the forklift 10 may adjoin the rail 20. For example, as shown in FIG. 3, a stop 25 in the form of an elongated tube of rectangular cross section can be secured to one leg of the rail 20, or it can be secured to the floor 23 independently of the rail 20. The stop 25 can prevent the objects 26 from abutting against the rail 20 and interfering with the movement of the forklift 10 along the rail 20.

The rail 20 can have any desired length depending on the distance over which the forklift 10 is to travel. The rail 20 may comprise a single section of angle iron, or a plurality of sections can be connected end to end in series.

The forklift 10 can be engaged with the rail 20 by driving the forklift 10 up to one end of the rail 20 so that the rail 20 passes between the rollers of both roller assemblies 30. Once the rollers engage the rail 20, the forklift 10 is automatically guided in the lengthwise direction of the rail 20 without the driver of the forklift 10 having to steer.

A guide system according to the present invention employing a single guide rail 20 is easier to install and maintain than a two-rail guide system, it permits the floor of the facility on which it is installed to be readily cleaned with a mechanical sweeper, and it can accurately guide a forklift along a path with less wear on the forklift or the guide system, resulting in an increased lifespan for both. It thus provides significant economic advantages over a two-rail guide system.

What is claimed is:

1. A method of operating a forklift comprising:

disposing objects to be lifted by a forklift on a floor adjoining an elongated stop extending alongside a guide rail;

moving the forklift on the floor along the guide rail with a pair of rollers mounted on a widthwise side of a body of the forklift in rolling engagement with a vertical portion of the guide rail; and lifting one of the objects with the forklift.

2. A method as claimed in claim 1 wherein the stop is secured to the guide rail.

3. A guide system for a forklift comprising:

a forklift;

a first pair of rollers mounted on a widthwise side of a body of the forklift;

a second pair of rollers mounted on a same widthwise side of the body of the forklift as the first pair of rollers and spaced from the first pair of rollers in a lengthwise direction of the forklift;

a guide rail comprising an L-shaped member having a horizontal portion supported on a floor on which the forklift can travel and a vertical portion of uniform thickness extending upwards from the horizontal portion between the two rollers of the first pair of rollers and between the two rollers of the second pair of rollers and engaging the rollers; and an elongated stop for positioning objects to be lifted by the forklift extending alongside the guide rail and secured to the horizontal portion of the guide rail, wherein the forklift can travel along the guide rail on the floor while being guided only by engagement between the rollers and the guide rail and the rollers can engage the vertical portion of the guide rail at progressively lower portions of the vertical portion as wheels of the forklift become worn.

4. A guide system as claimed in claim 3 wherein the first and second pairs of rollers have parallel axes of rotation.

5. A guide system as claimed in claim 3 wherein the first and second pairs of rollers have vertical axes of rotation.

6. A guide system as claimed in claim 3 wherein the rollers of each pair of rollers can simultaneously contact opposite sides of the guide rail.

7. A guide system as claimed in claim 3 including a frame which is secured to the body of the forklift and which has an elongated slot receiving one of the rollers of the first pair of rollers, the slot permitting a separation between the first pair of rollers to be adjusted by adjusting a position of the one of the rollers of the first pair of rollers along the slot.

8. A guide system as claimed in claim 3 wherein the guide rail contacts a floor on which wheels of the forklift are disposed.

9. A guide system as claimed in claim 3 wherein the guide rail comprises an angle iron.

10. A guide system as claimed in claim 3 including a third pair of rollers mounted on an opposite widthwise side of the body of the forklift from the first pair of rollers, the first and second pairs of rollers engaging with the guide rail when the forklift is traveling in one direction along the guide rail and the third pair of rollers engaging with the guide rail when the forklift is traveling in an opposite direction along the guide rail.

11. A guide system as claimed in claim 3 wherein the guide rail has a lengthwise end which can pass between the first and second pairs of rollers when the forklift is driven in a lengthwise direction of the guide rail to permit engagement and disengagement of the first and second pairs of rollers with respect to the guide rail.

12. A guide system as claimed in claim 3 including a device mounted on the forklift for grasping an object located to a widthwise side of the forklift.

* * * * *